Feb. 1, 1966     H. D. SCHWETMAN     3,233,086
METHOD AND APPARATUS FOR THE SOLUTION OF ROOTS OF POLYNOMIALS
Filed Jan. 15, 1960     2 Sheets-Sheet 2
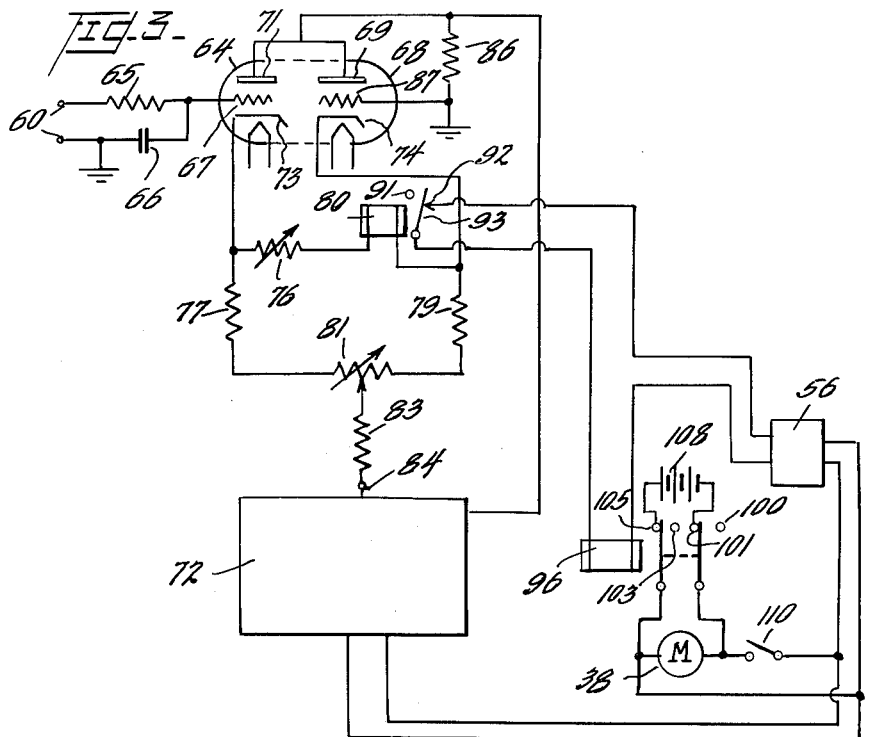
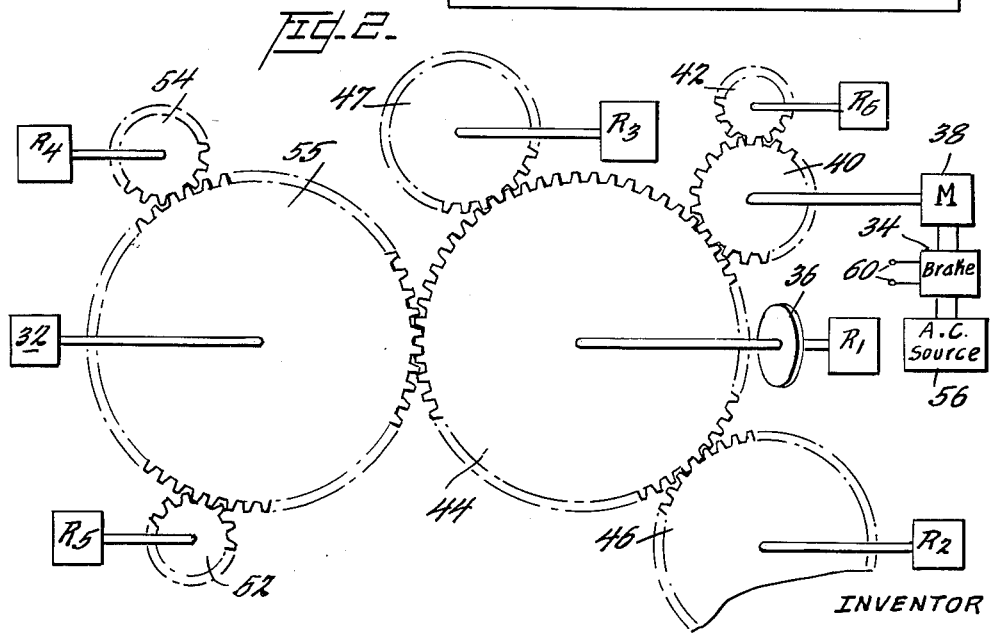
INVENTOR
Herbert O. Schwetman
BY Watson, Cole, Grindle & Watson
ATTORNEYS

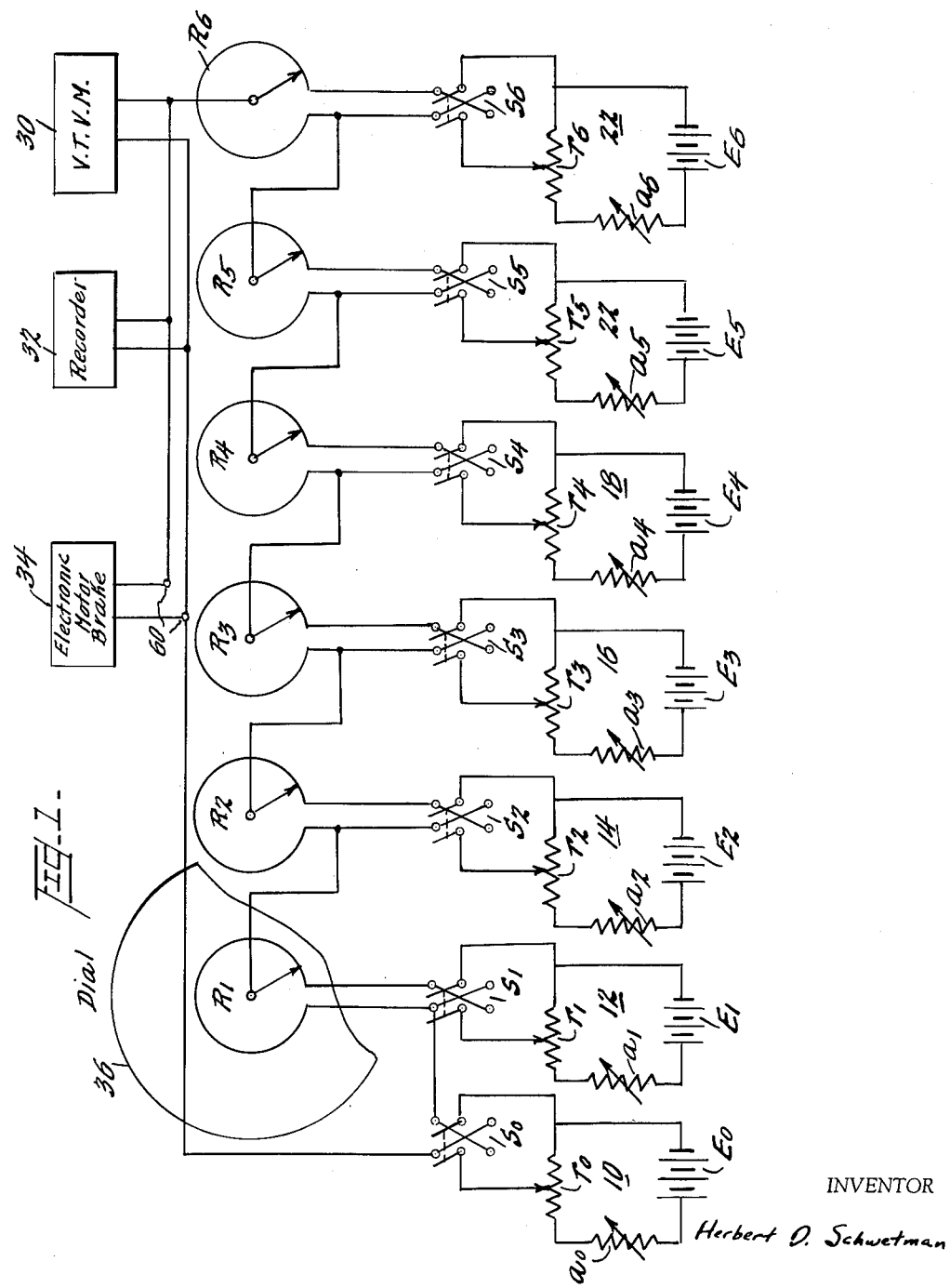

3,233,086
METHOD AND APPARATUS FOR THE SOLUTION OF ROOTS OF POLYNOMIALS
Herbert D. Schwetman, 3221 Cumberland Ave., Waco, Tex.
Filed Jan. 15, 1960, Ser. No. 2,646
11 Claims. (Cl. 235—180)

This invention relates to methods and apparatus for determining the roots of polynomials and more particularly to an electromechanical device and method for employing the same for the determination of the roots of polynomials of high degree.

The need for determining the roots of polynomials of high degree has resulted in the development of many methods and devices such as the mechanical and electronic isographs, the mechanical synthesizer, and many high speed digital and analog computers which operate with very desirable accuracy. These devices, however, are uniformly elaborate, complex and expensive.

Accordingly, it is an object of this invention to provide improved methods and apparatus for the solution of polynomials of high degree.

It is another object of this invention to provide a computing apparatus which is simple in construction, easy to operate, inexpensive and yet acceptably accurate in the determination of the roots of trigonometric polynomials.

It is another object of this invention to provide improved methods and apparatus for rapidly and accurately determining the roots of trigonometric polynomials of high degree.

It is another object of this invention to provide an apparatus for the solution of equations containing trigonometric polynomials of high degree, which apparatus is reliable in operation and contains a minimum of parts.

It is another object of this invention to provide an improved apparatus for the determination of the roots of trigonometric polynomials, which apparatus stops when a root is obtained.

Briefly, in accordance with aspects of this invention, an electromechanical synthesizer is devised which includes a plurality of serially connected sine-cosine potentiometers. These potentiometers are well known in the art. For example, they are described on page 15 of Principles of Analog Computation by George W. Smith and Roger C. Wood, McGraw-Hill Publishing Co., 1959. Each of the serially connected potentiometers is energized with a direct current potential, the magnitude and polarity of which are adjusted to represent the coefficient of respective terms in the polynomial. The potential applied to one potentiometer is indicative of the sign and magnitude of the coefficient of the first degree term. The potential applied to another potentiometer is indicative of the sign and magnitude of the coefficient of the second degree term and so on until the proper potential is applied to the $n$th harmonic potentiometer. If necessary, another potential is added to the series circuit, the sign and magnitude of which is indicative of the constant term of the equation. These sine-cosine potentiometers are connected in series with each other and with a current or voltage responsive device.

Each sine-cosine potentiometer is connected to a gear of a gear train. The gears of this train have proper ratios to produce rotation of the potentiometer contacts in accordance with harmonic frequencies of $f$, $2f$–$nf$, where $n$ is the highest degree of the equation to be solved. The one potentiometer, representing the first degree term, is rotated at the fundamental frequency. The second degree potentiometer is rotated at the frequency $2f$, etc., the $n$th sine-cosine potentiometer being rotated at the frequency $nf$. The gear train is driven by a drive motor and, advantageously, the drive motor is under the control of a zero current or voltage responsive brake. The brake is electrically connected in the circuit containing the sine-cosine potentiometers. When the potentiometers are energized and driven through the gear train, the current flowing in the series circuit will be indicative of the complex wave form of the equation to be solved. A large graduated dial is mounted on the shaft of the fundamental potentiometer to indicate the angle $\theta$ through which this potentiometer is rotated. This angle will be indicative of one of the roots of the trigonometric equation.

As is well known in mathematics, by substitution of trigonometric identities, an algebraic polynomial becomes a trigonometric polynomial. In other words, by substitution of an expression such as $x = r \cos \theta$ in the expression $f(x) = 0$ which is to be solved, the equation becomes $f(\theta) = 0$. The previously mentioned potentials are now applied to the respective potentiometers to represent the coefficients of the trigonometric equation. The potentiometer has two contacts: one initially positioned so that cosine values of potential will be developed, the other positioned so that sine values will be developed and applied to the series circuit. If the trigonometric term of the first degree term is a cosine, the cosine terminal of the first potentiometer is connected to the series circuit. If the term were a sine, the other terminal would have been connected in the circuit. The same procedure is followed for each sine-cosine potentiometer.

The current or voltage responsive brake is normally deactuated and is actuated when the current in the potentiometer series circuit falls to zero. Accordingly, each time the current or voltage, which is always in phase with the current, falls to zero, the brake terminates the rotation of the potentiometers and one of the trigonometric roots is indicated by the angle of rotation of the graduated dial. The sum of the terms in the trigonometric equation becomes zero for every root within the range $-r \leq x \leq +r$. Accordingly, each time the brake stops the gear train-driven potentiometers, the angle indicated on the dial is read and the motor is again started. The device continues to operate until again stopped by the brake, indicating another root. This cycle of operation is continued until all the trigonometric roots are determined. The corresponding algebraic root is obtained by substitution of the value for $\theta$ read from the dial into the equation, $x = r \cos \theta$.

Advantageously, a recording type voltmeter may also be employed to record the angular solutions of the trigonometric equations and these angular solutions may also be read directly from the angle dial each time the brake terminates the operation of the apparatus.

Accordingly, it is a feature of this invention to employ a plurality of sine-cosine potentiometers in a device for the solution of polynomials of high degree, to connect these potentiometers in series, to drive the contacts of the potentiometers at harmonically related frequencies, to terminate the rotation of the potentiometer contacts when the current in the series circuit is zero and to determine the angle of rotation of the fundamental potentiometer contact.

It is another feature of this invention to employ a plurality of serially connected sine-cosine potentiometers, to selectively apply different magnitudes and polarities of direct current potentials to the potentiometers, to drive the potentiometer contacts at harmonically related frequencies and to record the output current of the series circuit, which output current is indicative of the solutions of the polynomial equation.

It is another feature of this invention to connect a plurality of potentiometers in series, to apply direct current potentials to the respective potentiometers, which potentials correspond to the polarity and magnitude of the constant coefficients of a polynomial equation of high degree, to drive the potentiometer contacts at harmonically related frequencies until the series current is zero, terminate the rotation of the contacts, determine the angle of rotation of the potentiometer rotated at the fundamental frequency, which angle is indicative of one of the solutions of the equation, and to repeat the process until all of the roots have been determined.

It is another feature of this invention to provide a device for the solution of polynomial equations of high degree which includes a plurality of sine-cosine potentiometers connected in a series circuit, to apply separate potentials to each of the respective potentiometers, which potentials are indicative of the sign and magnitude of the constant coefficient associated with the polynomial which corresponds to that particular potentiometer, to employ a driving motor connected to the potentiometers through a series of harmonically related drive means, to drive one potentiometer at a predetermined fundamental frequency and each of the other potentiometers at frequencies harmonically related to the fundamental frequency, to connect a recording voltmeter to the series circuit, to connect a current responsive brake to the series circuit and to connect the brake to the drive motor whereby the drive motor is stopped at any time that the current in the series circuit is zero.

It is another feature of this invention to employ an electronic brake with an electromechanical polynomial root solver, which brake instantaneously de-energizes the drive motor from the contacts of the sine-cosine potentiometers when the current in the circuit including the sine-cosine potentiometers is zero, thereby indicating a root of the polynomial.

These and various other objects and features of this invention will be more clearly understood from a reading of the detailed description in conjunction with the drawings, in which:

FIGURE 1 is a combined schematic and block diagram of the electrical portions of one illustrative embodiment of this invention;

FIGURE 2 is a combined block diagram of electrical portions and plan view of the mechanical portions of this invention; and FIGURE 3 is a schematic diagram of the electronic brake indicated in block form in the illustrative embodiment of FIGURE 1.

Referring now to FIGURE 1, there is depicted in combined schematic and block diagram one illustrative embodiment of this invention. As shown in FIGURE 1, a plurality of "coefficient" circuits 10, 12, 14, 16, 18, 20 and 22 are employed. Like subscripts designate each of the elements of one of these circuits. Each of these coefficient circuits includes a source of potential E, a first variable resistance $a$ and a second variable resistance $r$. Connected to each of these coefficient circuits is a double-pole reversing switch S. These switches S are double-pole-double-throw switches for applying the potential drop across the resistor in the proper polarity to other portions of the circuitry.

A plurality of serial connected sine-cosine potentiometers $R_1$–$R_6$ are each connected to terminals of one of the reversing switches S so that they may be connected to the corresponding coefficient circuit with a predetermined polarity. A predetermined magnitude is determined by the associated resistor $r$. The sine-cosine potentiometers R are connected in a circuit which, as illustrated, includes vacuum tube voltmeter 30, a recording voltmeter 32 and an electronic motor brake 34. A suitable angle dial 36 is mounted on the shaft of potentiometer $R_1$ to indicate the angle through which the contact of potentiometer $R_1$ has been rotated.

The series circuits 12, 14, 16, 18, 20 and 22 are employed selectively to apply a potential to each of the respective sine-cosine potentiometers $R_1$–$R_6$. Each of these potentials is indicative of the sign and magnitude of the constant coefficient associated with the respective term of the equation, while the series circuit 10 is employed to apply a potential to the sine-cosine series circuit which is indicative of the constant term of the equation by adjusting the linear potentiometer $r_0$. As will be subsequently explained in greater detail, the sine-cosine potentiometers $R_1$–$R_6$ are connected through a gear train and driven by a suitable motor, the gear train being so arranged that the contact of potentiometer $R_1$ is driven at the fundamental frequency, the potentiometer $R_2$ is driven at twice the frequency of $R_1$, potentiometer $R_3$ is driven at a frequency three times the frequency of $R_1$ and this gear ratio-potentiometer frequency continues until the potentiometer $R_6$ is driven at a frequency six times the frequency of potentiometer $R_1$. Since the sine-cosine potentiometers are all connected in a single series circuit which includes linear potentiometer $r_0$, the current flowing in this circuit is indicative of the instantaneous values of the corresponding function of the equation inserted by means of manually or otherwise varying the positions of potentiometers $r_0$–$r_6$. Although both a recorder 32 and a vacuum tube voltmeter 30 are shown connected to the circuit which includes the sine-cosine potentiometers, it will be apparent that these may be employed alternatively, or they may be omitted entirely depending upon the particular mode of operation desired.

Referring now to FIGURE 2, there is depicted the gear train and the associated components of the illustrative embodiments of FIGURE 1. As shown in FIGURE 2, the gear train includes meshed gears 40 and 42 connected, respectively, to the drive motor 38 and the sine-cosine potentiometer $R_6$. Gear 44 meshes with gear 40 and is connected to potentiometer $R_1$. Gear 46 meshes with gear 44 and is operatively associated with potentiometer $R_2$. Gear 44 also meshes with gear 47 which is operatively associated with potentiometer $R_3$. Gear 50 is the same size as and meshes with gear 44 and also has a pair of gears 52 and 54 connected in driven relationship therewith. Potentiometer $R_5$ is operatively associated with gear 52, while potentiometer $R_4$ is driven by gear 54. The recorder 32 is connected by shaft 55 to gear 50. The electronic motor brake 34 is connected to an alternating current source 56 and to the drive motor 38. The electronic motor brake 34 selectively disconnects the alternating current from motor 38 and thus terminates the drive operation of the root solver in a manner which will be subsequently explained.

In the gear train, 44 is the fundamental gear which drives $R_1$, the fundamental cosine-potentiometer. Gear 46 drives cosine-potentiometer $R_2$ through angle $2\theta$ when $R_1$ is rotated through $\theta$. At the same time gear 47 drives $R_3$ through $3\theta$, 54 drives $R_4$ through $4\theta$, 52 drives $R_5$ through $5\theta$, and 42 drives $R_6$ through $6\theta$. The entire system is driven by the drive motor coupled through gear 40.

The angle through which the fundamental $G_1$ is rotated is indicated on the large angle dial 36. Also, the fundamental gear may drive the recording paper in the electronic recorder 32. The electronic motor-brake 34 is used to stop the drive motor and gear system automatically when a root is obtained.

By this arrangement the gears, cosine-potentiometers, and the recorder are driven in phase so that potentials of frequencies $f, 2f, 3f \ldots 6f$ are generated, serially added and recorded.

FIGURE 3 discloses a schematic representation of one illustrative electronic brake which may be employed in this device. The primary function of the brake is to terminate the operation of the device whenever a root of the equation is determined. A root of the equation is determined whenever the current in the serially connected potentiometers is zero or the voltage across terminals 60 is zero. Since this circuit is a resistive circuit, the current and voltage are in phase and will be simultaneously zero whenever a root is indicated. It is, therefore, apparent that the brake may respond either to a zero voltage or a zero current, depending on the way it is connected in the circuit. Previously, the brake has been referred to as a current responsive brake. In this illustrative example, however, the brake derives a voltage from the potentiometer circuit and employs this voltage to control the operation of a relay. This relay, in turn, controls the energization circuit of the drive motor for the gear train.

The terminals 60 in FIGURE 3 correspond to the terminals 60, shown in FIGURES 1 and 2. In FIGURE 3 a resistor 65 and a capacitor 66 are connected in series across the terminals 60. A dual triode-type tube, such as a 12AU7, has two triode sections 64 and 68. Grid 67 of section 64 is connected intermediate the resistor 65 and the capacitor 66. Both the anodes 69 and 71 are connected to the positive terminal 70 of power supply 72. The cathodes 73 and 74 are connected in a balanced cathode circuit which includes resistors 76, 77, 79 and 81 and relay 80. Resistor 81 is connected through a resistor 83 to negative terminal 84 of the power supply 72. A suitable resistor 86 is connected between the anodes 69 and 71 and ground to act as a load impedance for the anodes. A coarse adjustment of the current flowing through the two tubes is obtained by varying resistor 81. Resistor 76 is a sensitivity control to permit actuating current to flow through relay 80 for any voltage (either positive or negative) applied to terminals 60. Relay 80 has a pair of contacts 91 and 92 and an armature 93 operatively associated therewith.

If the potential applied to terminals 60 is positive, more current flows through triode 64 than through triode 68 and current flows from right to left, as viewed in FIGURE 3, through relay 80 and armature 93 is attracted to contact 91. If the potential applied to terminals 60 is negative, more current flows through triode 68 than through triode 64 and current flows from left to right, as viewed in FIGURE 3, through relay 80 and armature 83 is again attracted to contact 91. However, when the potential applied to terminals is zero, equal currents flow through triodes 64 and 68 and relay 80 is de-energized.

A suitable current source 56 is serially connected through contact 92 and the armature 93 to a second relay 96. Relay 96 controls the energizing circuit of the motor 38 through a suitable multiple contact arrangement. Relay 96 has a pair of armatures. Armature 99 moves between contacts 100 and 101, while armature 97 moves between contacts 103 and 105. When the armatures 97 and 99 are in closed circuit condition with contacts 101 and 105, i.e., to the left, as shown in FIGURE 3, the energizing circuit of the motor 38 is connected to a direct current potential source 108. This direct current potential acts as a brake to instantly terminate the rotation of the motor. When the armatures are in closed circuit relation with contacts 103 and 100, respectively, the alternating current source (not shown) is connected in energizing relationship with the motor 38.

As previously explained, at any time the potential applied across terminals 60 falls to zero, no current flows through relay 80 and, accordingly, relay 80 releases. When roots are being determined, the relay 80 is maintained in an actuated or open circuit position by current flowing in one direction or the other. The armature 93 is thus normally maintained against contact 91.

The release of relay 80 closes the energizing circuit to relay 96, causing the armatures to be disconnected from source 95 and connected to source 108. When the braking potential from source 108 is applied to the motor, motor 38 stops rotation of its associated gear 40, thus instantly stopping the rotation of the potentiometers. When the motor 38 stops, the position of the angle dial 36 connected to potentiometer $R_1$ is determined.

The angular position of this dial is indicative of one of the roots of the equation being solved. To re-start the device, it is only necessary to close switch 110 which energizes the circuit of motor 38 which, in turn, causes the current in the potentiometer circuit to change. This change in value of the current in the sine-cosine potentiometer circuit causes relay 80 to be again energized, thereby de-energizing relay 96 and motor 38 will now continue to be energized from source 95 through armatures until the current again falls to zero. This method is repeated until all of the solutions of the polynomial have been indicated.

The method of operation of the entire device will now be described for the solution of real roots of an algebraic polynomial and of complex roots of a polynomial.

Real roots

In order to determine the real roots of the algebraic polynominal $$f(x) = a_n x^n + a_{n-1} x^{n-1} + \ldots a_1 x + a_0 = 0$$

the substitution $x = r \cos \theta$ is made to obtain $$a_n r^n \cos^n \theta + a_{n-1} r^{n-1} \cos^{n-1} \theta + \ldots a_1 r \cos \theta + a_0 = 0$$

which is reduced to the trigonometric polynominal $$f(\theta) = \cos n\theta + b \cos (n-1)\theta \ldots + \cos \theta + A = 0$$

by substitution of trigonometric identities such as $$\cos^2 \theta = (\cos 2\theta + 1)/2$$

and $$\cos^3 \theta = (\cos 3\theta + 3 \cos \theta)/4$$

The cosine potentiometers, $R_1$–$R_6$, which are driven by the ganged gears (FIG. 2) are arranged to produce the componets of the above equation $f(\theta)$ as potentials. The cosinusoidal components are generated by the rotation through the angles $\theta$, $2\theta$, $3\theta$ . . . $n\theta$ of the sine-cosine potentiometers, $R_1$, $R_2$ . . . $R_n$. The proper amplitude is obtained by the adjustment of linear potentiometers, $r_1$, $r_2$, $r_3$ . . . $r_n$, and the proper sign by the position of switches $s_1$, $s_2$ . . . $s_n$. These potentials are summed in a vacuum tube voltmeter or plotted on a simple plotter as the fundamental gear is rotated. When the sum of the terms become zero, the angle through which the fundamental gear has turned is read from a large dial and the roots determined from substitution in the equation $z = r \cos \theta$. The sum becomes zero for every root within the range $-r = x \geq +r$.

The source of potential E, for each section is represented as batteries, although electronic D.C. power supplies may be used. The resistors, $a_0$–$a_6$, in series with the batteries are used as limiting resistors in the battery circuit. The reversing switches marked $S_n$ are used to change the sign of the coefficients $b$, $c$, . . . in the trigonometric polynomial. The sine-cosine potentiometers produce the component terms of the polynomial $$\cos n\theta, b \cos (n-1)\theta$$

etc., where the magnitude of the coefficients $b$, $c$, . . . are determined by the linear potentiometers, $r_1$, $r_2$ . . . $r_n$. The potentials which represent the trigonometric components are summed in the vacuum-tube voltmeter 30, and when this sum goes to zero, the angle is read on a large dial and the root is thus determined.

Complex roots

In the case of complex roots the substitution $x = x + iy$ is made in the algebraic polynomial. After simplification, the real part is equated to zero and the imaginary part separately equated to zero. The equation arising from equating the imaginary part to zero is solved for $y$ in terms of $x$. Substitution of this value of $y$ in the remaining equation results in an equation in $x$ alone, which is then transformed into the trigonometric or harmonic form by the substitution of $x = r \cos \theta$.

Thus, the resulting algebraic polynomials are reduced to trigonometric polynomials in the manner described for real roots. The voltages indicative of the terms are applied to the sine-cosine potentiometers with the correct sign and amplitude, the terms summed, and the roots determined when the sum goes to zero, after $x$ is determined, $y$ is determined by substitution.

An alternative method which makes use of the summing of the cosine and sine potentials separately as they arise from the substitution of $$x^n = r^n(\cos n\theta + i \sin n\theta)$$

In this case the amplitudes of the sine and cosine potentials of harmonic frequencies or angular displacements are summed separately in the vacuum tube voltmeter or recorder and the roots determined by substitution in $$x = r(\cos \theta + i \sin \theta)$$

as the sum of the terms goes to zero for each root.

This invention thus provides an improved and simplified algebraic polynomial solver which is designed to solve the polynomials for the real and complex roots by the direct summation of potentials of multiple frequencies with a high degree of accuracy. The device is a simple and economical application of commercially available sine-cosine potentiometers and other readily available components.

While I have shown and described various embodiments of my invention, it is understood that the principles thereof may be extended to many and varied types of apparatus. The invention, therefore, is not to be limited to the details illustrated and described herein.

What is claimed is:

1. A polynomial equation-solving device for obtaining the roots of a trigonometric polynomial of the type $$f(\theta) = a_n \cos n\theta + \ldots a_1 \cos \theta + a_0 = 0$$

said solver comprising a plurality of serially connected sine-cosine potentiometers one for each variable term in the polynomial, means for applying to each of said potentiometers a potential having a sign and magnitude indicative of one of the coefficients of said polynomial, drive means for cyclically varying the resistance of one of said potentiometers at a fundamental frequency and for cyclically varying the resistance of each of the other potentiometers at a different frequency harmonically related to said fundamental frequency and means for terminating the operation of said drive means when the current in said potentiometers is zero.

2. A device according to claim 1 further including direct current source means connected in series with said potentiometers for applying a potential indicative of the sign and magnitude of the constant term of said equation.

3. A device according to claim 2 further including angle indicating means connected to said one potentiometer to indicate the angle of rotation thereof.

4. A device according to claim 2 further including recorder means connected to said potentiometers to record the various values of current in said series circuit.

5. A device according to claim 2 wherein the means for terminating the operation of said drive means includes zero voltage responsive means connected to said potentiometer circuit.

6. A device according to claim 5 wherein said zero voltage responsive means includes at least two electron tubes each having an anode, a cathode and a control grid, one of said control grids being connected to said potentiometers and further including relay means connected in the cathode circuits of said electron tubes, said relay means being connected to control the operation of said drive means.

7. A device according to claim 6 further including an angle graduated dial on said one potentiometer for indicating the angle through which said one potentiometer is rotated.

8. A device according to claim 7 wherein said means for terminating the operation of said drive means further includes direct current source means connectable by said relay means to said drive means to instantaneously arrest said drive means when the current in said series circuit is zero.

9. A polynomial equation solving device for obtaining the roots of a trigonometric polynomial of the type $$f(\theta) = a_n \cos n\theta + \ldots a_1 \cos \theta + a_0 = 0$$

said solver comprising a plurality of serially connected sine-cosine potentiometers, one for each variable term in the polynomial and a serially connected linear potentiometer for providing the constant term $a_0$, means for applying to each of said potentiometers a potential having a sign and magnitude indicative of one of the coefficients of said polynomial, drive means for cyclically varying the resistance of one of said sine-cosine potentiometers at a fundamental frequency and for cyclically varying the resistance of each of the other sine-cosine potentiometers at a frequency harmonically related to said fundamental frequency and means connected to said potentiometers for measuring the current through said potentiometers.

10. A device according to claim 9, further including angle indicating means connected to said one potentiometer to indicate the angle of rotation thereof.

11. A device according to claim 9, further including an angle graduated dial on said one potentiometer for indicating the angle through which said one potentiometer is rotated.

References Cited by the Examiner
UNITED STATES PATENTS

| | | | |
|---|---|---|---|
| 2,575,951 | 11/1951 | Gilbert | 235—183 |
| 2,656,102 | 10/1953 | Redheffer | 235—183 |
| 2,660,700 | 11/1953 | Gates | 318—162 |

OTHER REFERENCES

Schooley: An Electro-Mechanical Method for Solving Equations, RCA Review, vol. III, No. 1, pp. 86–96, July 1938.

MALCOLM A. MORRISON, *Primary Examiner.*

CORNELIUS D. ANGEL, *Examiner.*